US012073052B2

(12) United States Patent
Jiang et al.

(10) Patent No.: US 12,073,052 B2
(45) Date of Patent: Aug. 27, 2024

(54) INFORMATION DISPLAY METHOD AND DEVICE, TERMINAL AND STORAGE MEDIUM

(71) Applicant: BEJING ZITIAO NETWORK TECHNOLOGY CO., LTD., Beijing (CN)

(72) Inventors: Yan Jiang, Beijing (CN); Tianlong Lin, Beijing (CN); Qianmin Zhang, Beijing (CN); Yonghao Zhang, Beijing (CN); Yongliang Zhang, Beijing (CN); Chen Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 18/086,483

(22) Filed: Dec. 21, 2022

(65) Prior Publication Data

US 2023/0124204 A1 Apr. 20, 2023

Related U.S. Application Data

(63) Continuation of application No. PCT/CN2021/129017, filed on Nov. 5, 2021.

(30) Foreign Application Priority Data

Nov. 6, 2020 (CN) ........................ 202011232905.3

(51) Int. Cl.

*G06F 3/0481* (2022.01)
*H04L 51/10* (2022.01)

(Continued)

(52) U.S. Cl.

CPC ............ *G06F 3/0481* (2013.01); *H04L 51/10* (2013.01); *H04L 51/216* (2022.05); *H04L 51/04* (2013.01)

(58) Field of Classification Search

None

See application file for complete search history.

(56) References Cited

U.S. PATENT DOCUMENTS 9,483,529 B1 * 11/2016 Pasoi ...................... H04L 51/52
11,201,844 B2 * 12/2021 Kwatra ................ H04L 51/216

(Continued)

FOREIGN PATENT DOCUMENTS

CN 106302108 A 1/2017
CN 110191231 A 8/2019

(Continued)

OTHER PUBLICATIONS

International Patent Application No. PCT/CN2021/129017; Int'l Search Report; dated Jan. 28, 2022; 2 pages.

*Primary Examiner* — Tuyetlien T Tran

(74) *Attorney, Agent, or Firm* — BakerHostetler

(57) ABSTRACT

The disclosure relates to the technical field of computers, in particular to information display method and device, terminal and storage medium. The method provided by the embodiments of the disclosure comprises: acquiring a new target message associated with a user account currently logged in a client; displaying a first reminder view associated with a first new target message; displaying a message user interface containing the first new target message in response to an operation of triggering the first reminder view; and associating the first reminder view with a second new target message after the first reminder view is triggered.

20 Claims, 11 Drawing Sheets

(51) Int. Cl.

| | |
|---|---|
| ***H04L 51/216*** | (2022.01) |
| *H04L 51/04* | (2022.01) |

(56) References Cited

U.S. PATENT DOCUMENTS

| | | | | |
|---|---|---|---|---|
| 2003/0050986 | A1* | 3/2003 | Matthews | G06Q 10/109 715/963 |
| 2013/0111356 | A1* | 5/2013 | Vasudevan | H04M 1/27475 715/753 |
| 2017/0046025 | A1* | 2/2017 | Dascola | G06F 3/04883 |
| 2017/0054670 | A1* | 2/2017 | Lee | H04M 1/72436 |
| 2017/0346777 | A1* | 11/2017 | Kim | G06F 3/0482 |
| 2017/0357422 | A1* | 12/2017 | Jon | G06F 3/0482 |
| 2018/0260782 | A1* | 9/2018 | Bay | H04L 51/48 |
| 2019/0138174 | A1* | 5/2019 | Deets, Jr. | H04M 1/7243 |
| 2020/0076759 | A1* | 3/2020 | Kwatra | G06F 3/0482 |
| 2022/0053083 | A1* | 2/2022 | Wu | H04M 1/72472 |

FOREIGN PATENT DOCUMENTS

| | | | |
|---|---|---|---|
| CN | 111010332 | A | 4/2020 |
| CN | 111343081 | A | 6/2020 |
| CN | 111399709 | A | 7/2020 |
| CN | 112346806 | A | 2/2021 |
| WO | WO 2018/036278 | A1 | 3/2018 |
| WO | WO 2018/094572 | A1 | 5/2018 |

* cited by examiner

INFORMATION DISPLAY METHOD AND DEVICE, TERMINAL AND STORAGE MEDIUM

CROSS REFERENCE TO RELATED APPLICATIONS

The present disclosure is a continuation of PCT Application No. PCT/CN2021/129017, titled "INFORMATION DISPLAY METHOD AND DEVICE, TERMINAL AND STORAGE MEDIUM", filed on Nov. 5, 2021, which claims priority to Chinese Patent Application No. 202011232905.3, filed on Nov. 6, 2020, titled "INFORMATION DISPLAY METHOD AND DEVICE, TERMINAL AND STORAGE MEDIUM", both of which are incorporated by reference herein in their entireties.

FIELD

The disclosure relates to the technical field of computers, in particular to information display method and device, terminal and storage medium.

BACKGROUND

Instant messaging software plays a very important role in daily life and work of people. A client may often receive many messages, group messages, comments and the like related to or unrelated to a user, and it is not easy for the user to rapidly recognize and process relevant information therefrom, so that the work efficiency and interactive experience of the user are reduced.

SUMMARY

This summary part is provided to introduce concepts in a brief form, and these concepts will be further described in the following specific embodiments. The summary is intended to neither identify key features or essential features of the claimed technical solutions nor limit the scope of the claimed technical solutions.

One aspect of the disclosure provides a method for displaying information, comprising:

- acquiring a new target message associated with a user account currently logged in a client;
- displaying a first reminder view associated with a first new target message;
- displaying a message user interface containing the first new target message in response to an operation of triggering the first reminder view; and
- associating the first reminder view with a second new target message after the first reminder view is triggered.

Yet another aspect of the disclosure provides a method for displaying information, comprising.

- acquiring a new target message associated with a user account currently logged in a client which is provided with a communication user interface for displaying one or more topic user interfaces configured to display target messages;
- displaying a second reminder view associated with the new target message;
- displaying a topic user interface associated with a first new target message in response to an operation of triggering the second reminder view,
- wherein a content displayed in the second reminder view is changed as one or more topic user interfaces associated with the new target message is first displayed in a display area of a terminal.

Yet another aspect of the disclosure provides a device for displaying information, comprising:

- at least one processor; and
- at least one memory communicatively coupled to the at least one processor and storing instructions that upon execution by the at least one processor cause the device to:
- acquire a new target message associated with a user account currently logged in a client;
- display a first reminder view associated with a first new target message;
- display a message user interface containing the first new target message in response to an operation of triggering the first reminder view; and
- associate the first reminder view with a second new target message after the first reminder view is triggered.

Yet another aspect of the disclosure provides a device for displaying information, comprising:

- at least one processor; and
- at least one memory communicatively coupled to the at least one processor and storing instructions that upon execution by the at least one processor cause the device to:
- acquire a new target message associated with a user account currently logged in a client which is provided with a communication user interface for displaying one or more topic user interfaces configured to display target messages;
- display a second reminder view associated with the new target message;
- display a topic user interface associated with a first new target message in response to an operation of triggering the second reminder view,
- wherein a content displayed in the second reminder view is changed as one or more topic user interfaces associated with the new target message is first displayed in a display area of a terminal.

The embodiments disclosed herein enable a first reminder view to be associated with different new target message in response to an operation of a user and make it is more conveniently for the use to rapidly view a plurality of new target message via the first reminder view by associating the first reminder view with the first new target message, displaying a message user interface containing the first new target message in response to an operation of triggering the first reminder view; and associating the first reminder view with a second new target message after the first reminder view is triggered.

The embodiments disclosed herein allow users to conveniently view the topic user interface associated with the first new target message by displaying a topic user interface associated with a first new target message in response to an operation of triggering the second reminder view, and enable the second reminder to indicate the current unread message continuously and accurately by changing a content displayed in the second reminder view as the topic user interface associated with any of the new target message is displayed on a terminal display area for the first time, which is convenient for the user to perform subsequent interaction operations.

BRIEF DESCRIPTION OF THE DRAWINGS

The above-mentioned and other features, advantages and aspects of all the embodiments of the present disclosure will be more obvious in conjunction with the accompanying drawings and with reference to the following specific embodiments. In the accompanying drawings, the same or similar reference numerals in the accompanying drawings represent the same or similar elements. It should be understood that the accompanying drawings are illustrative, and components and elements are not necessarily drawn to scale.

DETAILED DESCRIPTION OF THE DISCLOSURE

Figure 1:
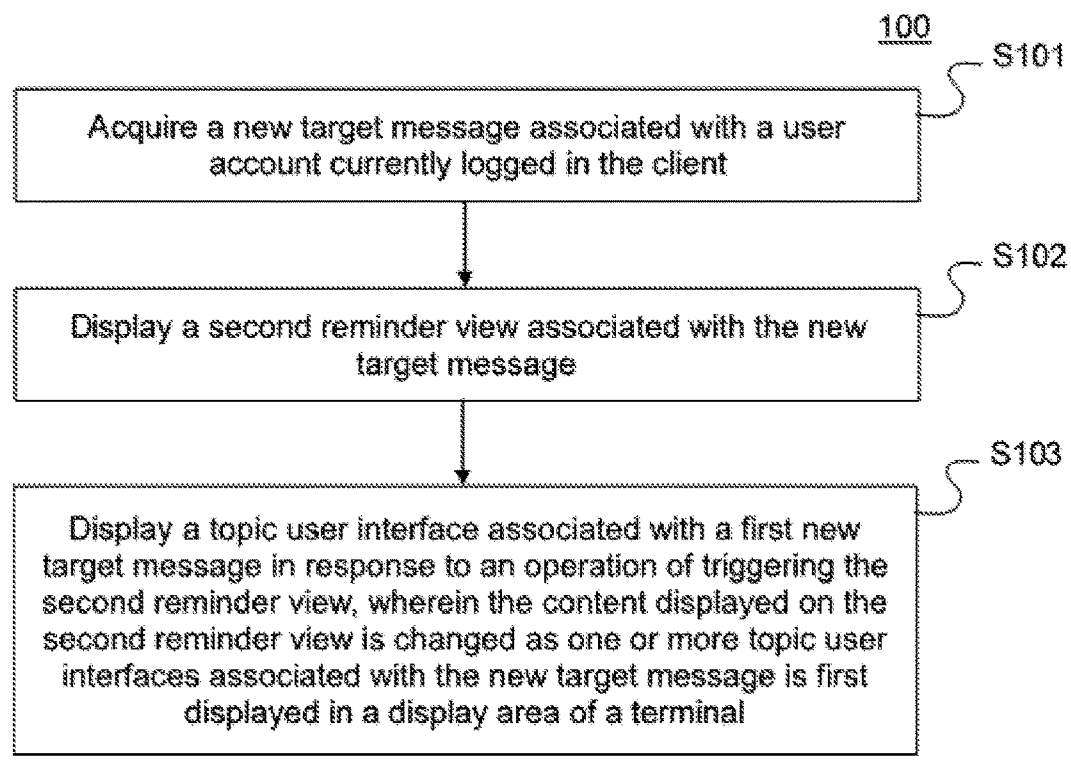
FIG. 1 shows a flow chart of a method for displaying information according to an embodiment of the present disclosure.

The embodiments of the disclosure will be described in more detail below with reference to the accompanying drawings. Although some embodiments of the disclosure are shown in the accompanying drawings, it should be understood that the disclosure may be implemented in various forms and should not be construed as being limited to the embodiments described herein, on the contrary, these embodiments are provided for a more thorough and complete understanding of the disclosure. It should be understood that the accompanying drawings and embodiments of the disclosure are merely illustrative, rather than limiting the scope of protection of the disclosure.

It should be understood that the steps described in the embodiments of the disclosure may be performed according to different orders and/or in parallel. In addition, the embodiments may include additional steps and/or omit the execution of the shown steps. The scope of the disclosure is not limited in this aspect.

The term "comprising" used herein and variants thereof means open-ended including, i.e., "including, but not limited to". The term "based on" refers to "based at least in part on". The term "one embodiment" represents "at least one embodiment"; the term "the other embodiment" represents "at least one additional embodiment"; and the term "some embodiments" represents "at least some embodiments". The term "in response to" and related terms mean that one signal or event is influenced to some extent by another signal or event, but not necessarily completely or directly. If an event x occurs in response to another event y, x can be directly or indirectly in response to y. For example, the occurrence of y can eventually result in the occurrence of x, but there may be other intermediate events and/or conditions. In other scenarios, y may not necessarily result in the occurrence of x, and x may occur even though y has not occurred. Furthermore, the term "in response to" can also mean "at least partially in response to". The term "determining" encompasses a wide variety of actions including calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like as well as resolving, selecting, choosing, establishing and the like. Definitions of other terms will be provided in the description below.

It should be noted that the terms such as "first", "second" and the like mentioned in the disclosure are merely intended to distinguish different devices, modules or units, rather than limiting an order of functions executed by these devices, modules or units or an interdependence among these devices, modules or units.

It should be noted that the modifications of "a" and "multiple" mentioned in the disclosure are illustrative, but are not restrictive. It should be understood by those skilled in the art that it should be understood as "one or more" unless otherwise specified in the context.

For the purposes of the present disclosure, the phrase "A and/or B" means (A), (B), or (A and B).

Names of messages or information interacted among a plurality of devices in the embodiments of the disclosure are merely for an illustrative purpose, rather than limiting the scope of these messages or information.

Referring to FIG. 1, FIG. 1 shows a flow chart of a method 100 for displaying information according to an embodiment of the disclosure. The method 100 is applied in an instant messaging client provided with a communication user interface used for displaying one or more topic user interfaces, and the topic user interfaces are used for displaying target message. The method 100 includes steps S101 to S103.

Step S101: acquiring a new target message associated with a user account currently logged in the client.

The client may be installed on a mobile terminal or a PC terminal, includes, but is not limited to an instant messaging application, a web browser, etc. The client may receive target message which is pushed by a server and is associated with the account logged in currently, the target message includes, but is not limited to a point-to-point message, a group sending message, a comment message, a comment reply message, a topic, etc., and the new target message, or unread message, includes target message which is received by the client and has not been read by a user or has not been marked as a read message by the client.

Exemplarily, a client may default to a target message pushed by a server as a new target message upon receiving it, and if the new target message is then read by a user, for example, is displayed on a screen or is regarded to be read by the client according to a specific rule, the new target message will be converted into a read message.

Step S102: displaying a second reminder view associated with the new target message.

Step S103: displaying a topic user interface associated with a first new target message in response to an operation of triggering the second reminder view, wherein a content displayed in the second reminder view is changed as one or more topic user interfaces associated with the new target message is first displayed in a display area of a terminal.

In the embodiment, the operation of triggering the second reminder view includes, but is not limited to a touch operation, a selection operation using an external device, a voice operation, a gesture operation, etc. And the first new target message may be any target message in the new target message. Preferably, the new target message is the latest target message sent, that is, the latest target message received by the client.

Optionally, the step S103 includes a step of displaying a part of the communication user interface where the topic user interface associated with the first new target message is located to show the topic user interface.

Optionally, the second reminder view displays the number of the new target message, and number of the new target message displayed on the second reminder view is reduced as one or more topic user interfaces associated with the new target message is first displayed in a display area of a terminal.

It should be noted that the step that "displaying a topic user interface associated with a first new target message" includes a situation that the topic user interface is partially displayed, for example, only an upper or lower half part of the topic user interface is displayed on the communication user interface.

It should be noted that the position of the second reminder view on a client interface may be constant or may also be correspondingly adjusted according to the current interface layout, which is not limited herein.

In some embodiments, the new target message is a new topic, and the second reminder view displays the number of the new topics, wherein the communication user interface is configured to display one or more topic user interfaces, and the topic user interfaces are configured to allow more than two members to interact with each other in the topic user interfaces.

Figure 2A:
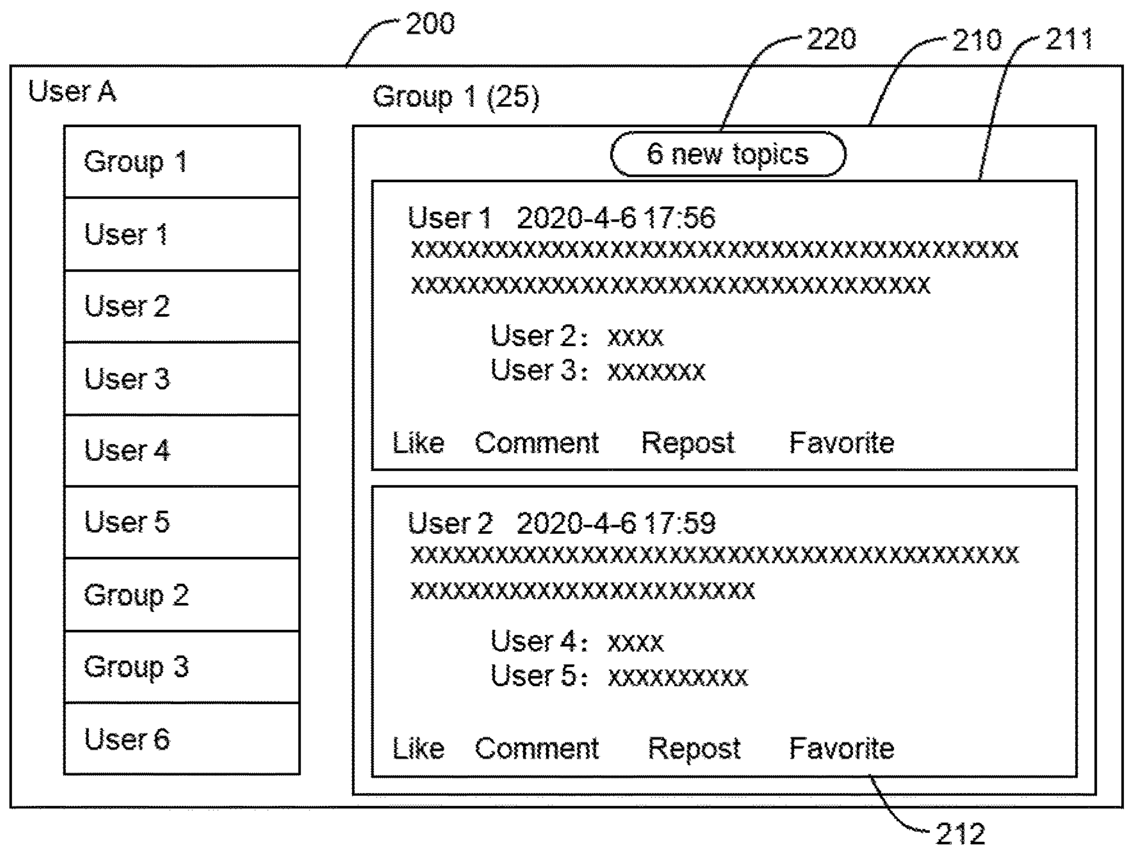
FIGS. 2A to 2C show schematic diagrams of a user interface of a client according to an embodiment of the present disclosure.
Figure 2B:
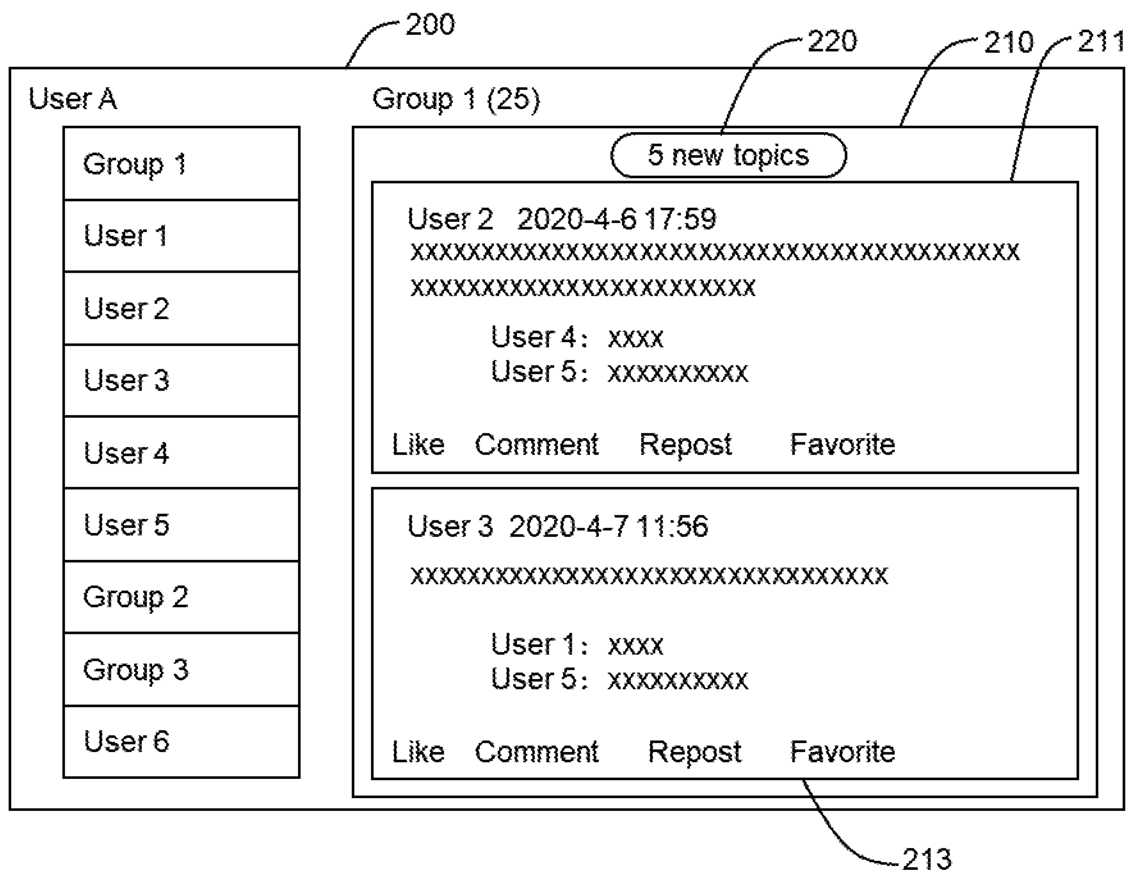
Figure 2C:
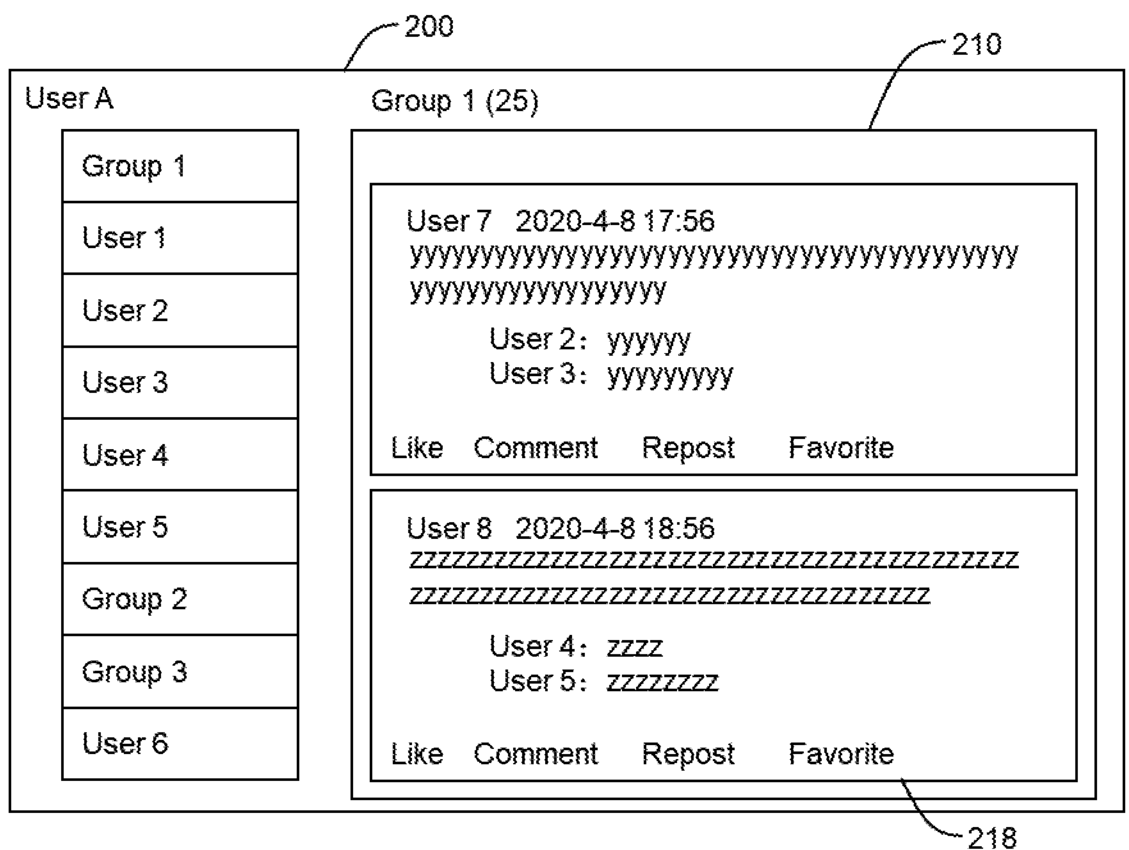

Exemplarily, referring to FIG. 2A, a client 200 includes a communication user interface 210 of "group 1", topic user interfaces 211 and 212 are displayed on the communication user interface 210, members in the group 1 may interact with each other on relevant topics in the topic user interfaces 211 and 212, for example, the members in the "group 1" may like, comment, repost or favorite a topic published by "user 1" or "user 2". A second reminder view 220 may be displayed on the top of the communication user interface 210 and is configured to remind a new topic received by the client, referring to FIG. 2A, the second reminder view may display "6 new topics". Referring to FIG. 2A to FIG. 2C, if a user clicks the second reminder view 220, the communication user interface 210 is automatically positioned to a location where a first new topic user interface 218 (the latest new topic user interface) is located, at the moment, the client may mark the 6 new topics as read topics, and the communication user interface 210 may stop displaying the second reminder view 220. Referring to FIG. 2A and FIG. 2B, if the user does not click the second reminder view 220, but manually controls the communication user interface 210 to upwards roll to start to display the new topic user interface and if the communication user interface 210 displays a new topic user interface 213 posted by "user 3", the second reminder view 220 is correspondingly changed from the "6 new topics" as displayed in FIG. 2A to "5 new topics" as displayed in FIG. 2B. Similarly, if the user further controls the communication user interface 210 to upwards roll to display other new topic user interfaces, the number of new topics displayed by the second reminder view is further correspondingly reduced. And the user may also stop controlling the communication user interface as shown in FIG. 2B to roll and click the second reminder view 220 displaying "5 new topics", so that the communication user interface 210 is directly positioned to a location where the first new topic user interface 218 (the latest new topic user interface) is located as shown in FIG. 2C.

In doing so, embodiments disclosed herein allow users to conveniently view the topic user interface associated with the first new target message by displaying a topic user interface associated with a first new target message in response to an operation of triggering the second reminder view, and enable the second reminder to indicate the current unread message continuously and accurately by changing a content displayed in the second reminder view as the topic user interface associated with any of the new target message is displayed on a terminal display area for the first time, which is convenient for the user to perform subsequent interaction operations.

In one or more embodiments of the disclosure, the number of new topics is displayed in a reminder instead of the number of new messages, which is more suitable for instant messaging clients with topic functions, making message reminders more efficient and avoiding unnecessary interference. Specifically, since message types in the instant messaging client become diversified after the topic mode is introduced, topic messages will be increased sharply with an increase of users participating in topic discussion; if messages are reminded based on the number of the new messages, it will easily cause interference to users and make it difficult for users to grasp the key points. On the contrary, by acquiring and reminding the number of new topics, the user can be effectively reminded of useful information, so as to avoid unnecessary interference to the user and reduce the consumption of computing resources.

A method for displaying information according to one or more embodiments of the disclosure includes: acquiring one or more new target messages associated with a user account currently logged in a client; displaying a first reminder view associated with any of the one or more new target messages; and displaying a message user interface containing the new target message associated with the first reminder view in response to an operation of triggering the first reminder view, wherein the new target message with which the first reminder view is associated is replaced as the first reminder view is triggered.

Optionally, the first reminder view is initially associated with to the latest or earliest new target message.

In some embodiments, by making the reminder view display new messages and their summary (such as the sender ID of the new message,) one by one, and if the reminder view is triggered, the conversation interface is positioned to the location of the new message, which can facilitate the user to view the new message. Moreover, before viewing the new message, the user can know the summary of the new message in advance through the reminder view, so that the user can decide whether to view the new message at present, so as to facilitate the user to process information more flexibly.

Figure 3:
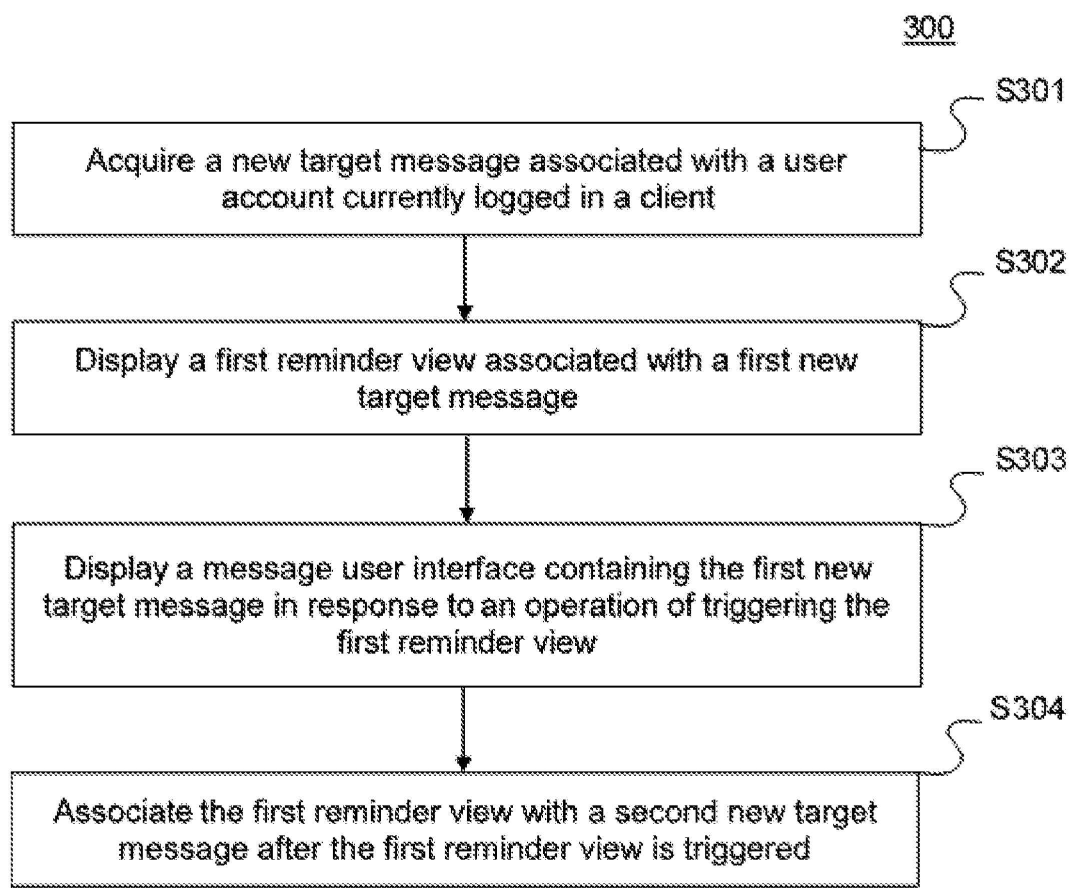
FIG. 3 shows a flow chart of a method for displaying information according to another embodiment of the present disclosure.

Referring to FIG. 3, FIG. 3 shows a flow chart of a method 300 for displaying information according to an embodiment of the disclosure. The method includes steps S301 to S304.

Step S301: acquiring a new target message associated with a user account currently logged in a client.

The client may be installed on a mobile terminal or a PC terminal, includes, but is not limited to an instant messaging application, a web browser, etc. The client may receive target message which is pushed by a server and is associated with the account currently logged in, the target message includes, but is not limited to a point-to-point message, a group sending message, a comment message, a comment reply message, etc., and the new target message or unread message, includes target message which is received by the client and has not been read or has not been marked as a read message by the client.

Exemplarily, a client may default to a target message pushed by a server as a new target message upon receiving it, and if the new target message is then read by a user, for example, the target message is displayed on a screen or is regarded to be read by the client according to a specific rule, the new target message will be converted into a read message.

Step S302: displaying a first reminder view associated with a first new target message. Optionally, the client is provided with a communication user interface on which the first reminder view is displayed.

Step S303: displaying a message user interface containing the first new target message in response to an operation of triggering the first reminder view.

In the embodiment, the operation of triggering the first reminder view includes, but is not limited to a touch operation, a selection operation using an external device, a voice operation, a gesture operation, etc. And the first new target message may be any target message in the new target message. Preferably, the first new target message is the earliest new target message.

In some embodiments, the message user interface includes an instant messaging message user interface for displaying target message, such as a "message bubble" view.

In some embodiments, the message user interface includes an interface used for displaying topic messaging including topics or topic replies, and the target message may be message included by the topics or the topic replies. It should be noted that in the embodiment, the first new target message may be currently displayed or hidden by the message user interface if the message user interface is displayed, which is not limited herein.

Step S304: associating the first reminder view with a second new target message after the first reminder view is triggered.

The second new target message may be any target message except for the first new target message among the new target messages acquired. Preferably, the second new target message is a target message whose sending or arrival time is second only to that of the first target message.

In some embodiments, the first new target message may be a single message or a group of messages of a specific category, and the number of the group of messages may be one or more; and the second new target message may be a single message or a group of messages of another specific category, and the number of the group of messages may be one or more. For example, a first new target message may include a message containing a User ID (for example, information of a user currently logged in the client specially mentioned through an identifier such as @), or a reply to a message sent from the user or a message in which the user is mentioned by different other users, for example, a message in which Tom is mentioned by Dick and a message in which Tom is mentioned by Harry may respectively belong to different categories of messages. Therefore, new messages may be viewed one by one or according to categories, and reminder views of messages which have not been viewed are further displayed in the new message viewing process, so that other new messages are viewed conveniently, and the new messages are viewed more conveniently and efficiently. Therefore, in the process of viewing the messages one by one or by category, by continuously displaying the reminder view associated with the unread messages that have not been viewed, it is convenient for the user to view the unread messages, and the process of viewing of the unread messages is more convenient and efficient.

According to the method provided by the disclosure, by associating a first reminder view with a first new target message, displaying a message user interface containing the first new target message in response to an operation of triggering the first reminder view; and associating the first reminder view with a second new target message after the first reminder view is triggered, the first reminder view can be associated with different new target message in response to an operation of a user, so that the user may be reminded of viewing the different new target message in sequence, and it is more convenient for user to rapidly view a plurality of or a plurality of kinds of new target message by virtue of the first reminder view.

Optionally, before the first reminder view is triggered, a content displayed in the first reminder view is associated with the first new target message.

Optionally, after the first reminder view is triggered, a content displayed in the first reminder view is associated with the second new target message.

Exemplarily, the first reminder view may display all or a part of content, content summary, poster or sender information, sending time, comment objects, and the like, of the first new target message or the second new target message.

It should be noted that the position of the first reminder view on a client interface may be constant or may also be correspondingly adjusted based on the current interface layout, which is not limited herein.

In some embodiments, the step S302 includes: displaying the first reminder view on the message user interface containing the first new target message; and the step S303 includes: moving the message user interface containing the first new target message to a location where the first new target message is represented. In doing so, embodiments disclosed herein allow users to position the associated new target message within a single message user interface by virtue of the first reminder view.

The client is provided with a communication user interface which is configured for displaying one or more message user interfaces and configured for an instant messaging session among users who may create topics in the communication user interface, and the created topics are displayed in the communication user interface in a form of the message user interface through which the users may comment the topics, reply comments, like, repost and subscribe the topics and the like.

Figure 4:
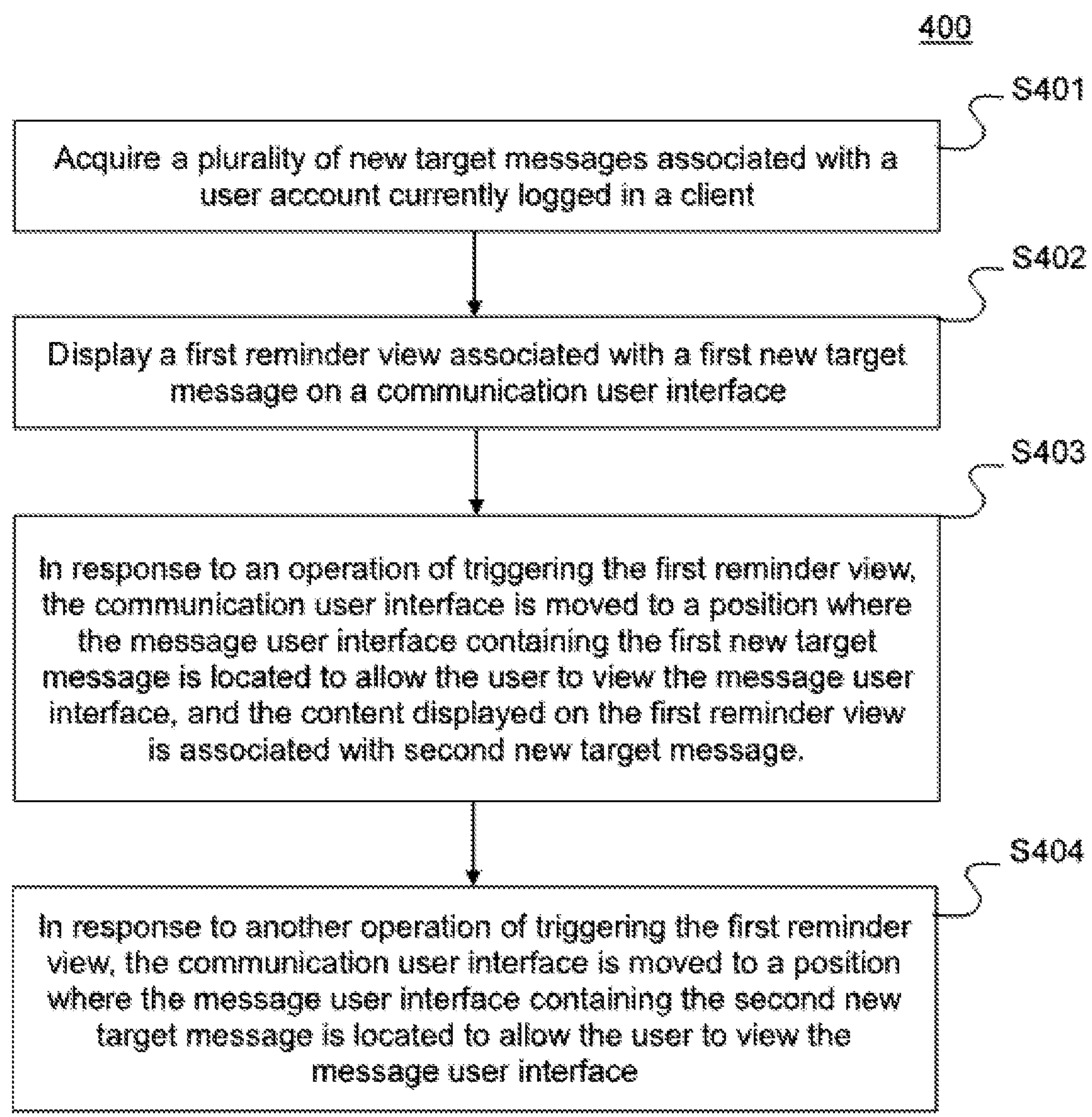
FIG. 4 shows a schematic structural diagram of a method for displaying information according to an embodiment of the present disclosure.

Referring to FIG. 4, FIG. 4 shows a flow chart of a method 400 for displaying information according to an embodiment of the disclosure. The method includes steps S401 to S404.

Step S401: acquiring a plurality of new target messages associated with a user account currently logged in a client.

Step S402: displaying a first reminder view associated with a first new target message on a communication user interface.

Exemplarily, the first reminder view may display all or a part of the content of the first new target message or information of a user sending the first new target message.

Step S403: in response to an operation of triggering the first reminder view, the communication user interface is moved to a position where the message user interface containing the first new target message is located to allow the user to view the message user interface, and a content displayed in the first reminder view is associated with second new target message.

Exemplarily, after the first reminder view is triggered, the first reminder view may display all or a part of the content of the second new target message or information of a user sending the second new target message.

Step S404: in response to another operation of triggering the first reminder view, the communication user interface is moved to a position where the message user interface containing the second new target message is located to allow the user to view the message user interface.

In doing so, embodiments disclosed herein allows users to conveniently view a plurality of new target message respectively displayed in the same or different message user interfaces by virtue of the first reminder view in the communication user interface.

In some embodiments, the step S402 includes:

the first reminder view displays user information of a user sending the first new target message.

In some embodiments, the step S403 includes:

the first reminder view displays user information of a user sending the second new target message.

In some embodiments, the first reminder view displays the amount of the new target message and the amount displayed by the first reminder view is reduced accordingly as one or more new target messages are displayed in a terminal display area for the first time.

Optionally, the message user interface is configured to allow more than two users to interact with each other in the message user interface.

Optionally, the new target message includes an identifier (for example, "@Mr. Smith") associated with the account.

Figure 5A:
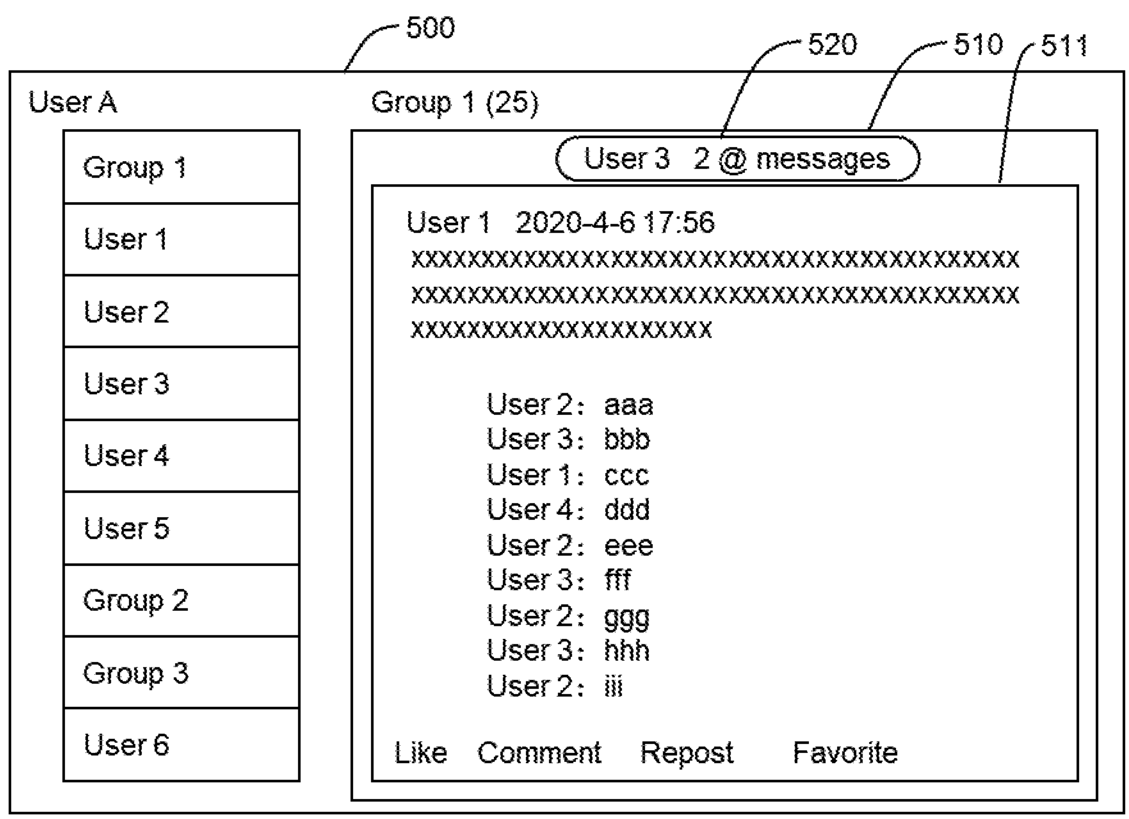
FIGS. 5A to 5C show schematic diagrams of a user interface of a client according to another embodiment of the present disclosure.
Figure 5B:
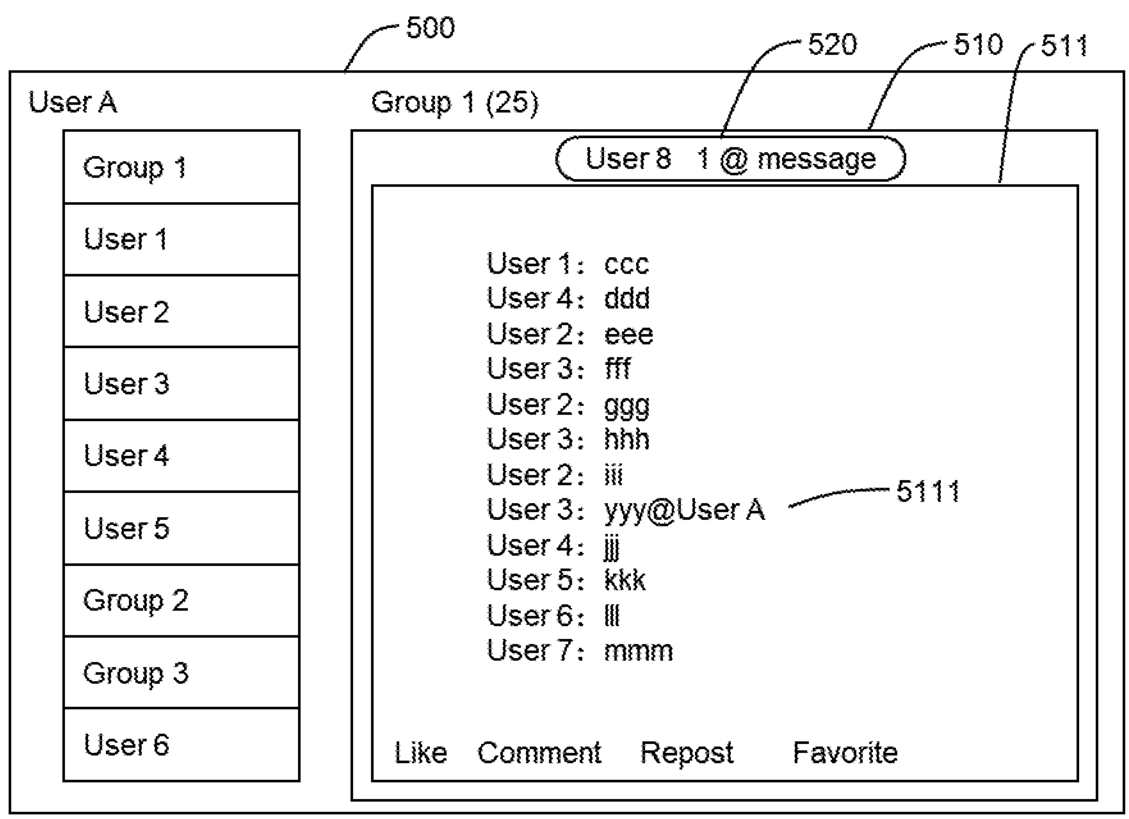
Figure 5C:
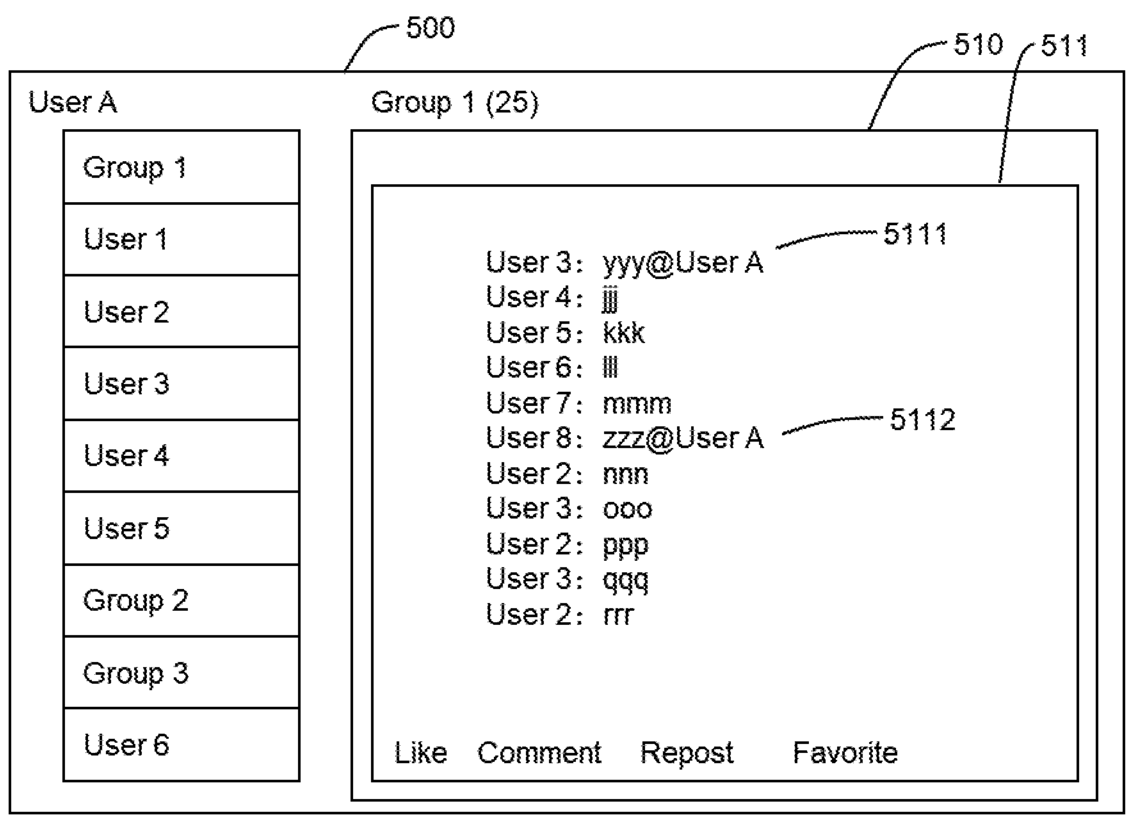

Exemplarily, referring to FIG. 5A, a client 500 of "user A" includes a communication user interface 510 associated with "group 1" displaying a message user interface 511 associated with a topic posted by "user 1", and members in the "group 1" may interact with each other about the topic posted by the "user 1" on the message user interface 511. A first reminder view 520 is displayed on the communication user interface 510 and is configured to remind "user A" of new target message received by the client, for example, a content displayed in the first reminder view is "user 3 2@ messages". Referring to FIG. 5A and FIG. 5B, if a user clicks the first reminder view 520, the message user interface 511 of the communication user interface 510 is automatically moved or skipped to display the first new target message 5111 ("user 3 yyy @user A"), at the moment, the content displayed in the first reminder view 520 is correspondingly changed from the "user 3 2@ messages" displayed in FIG. 5A to "user 8 1 @ message" displayed in FIG. 5B. Referring to FIG. 5B and FIG. 5C, if the user clicks the first reminder view 520 again, the message user interface 511 of the communication user interface 510 is automatically moved or skipped to display the second new target message 5112 ("user 8: zzz @user A).

In some embodiments, the method 300 further includes the following operations: displaying a third reminder on the message user interface containing the first new target message if the first new target message is not currently represented on the message user interface, wherein a content displayed in the third reminder is associated with the first new target message.

In some embodiments, the client is provided with a communication selection interface including at least one communication entry interface, configured to access the corresponding communication user interface; and the method 300 further includes the following operations: displaying a fourth reminder in the communication entry interface associated with the first new target message, wherein a content displayed in the fourth reminder is associated with the first new target message.

Exemplarily, the fourth reminder may display all or a part of the content of the first new target message or information of a user sending the first new target message.

Figure 6:
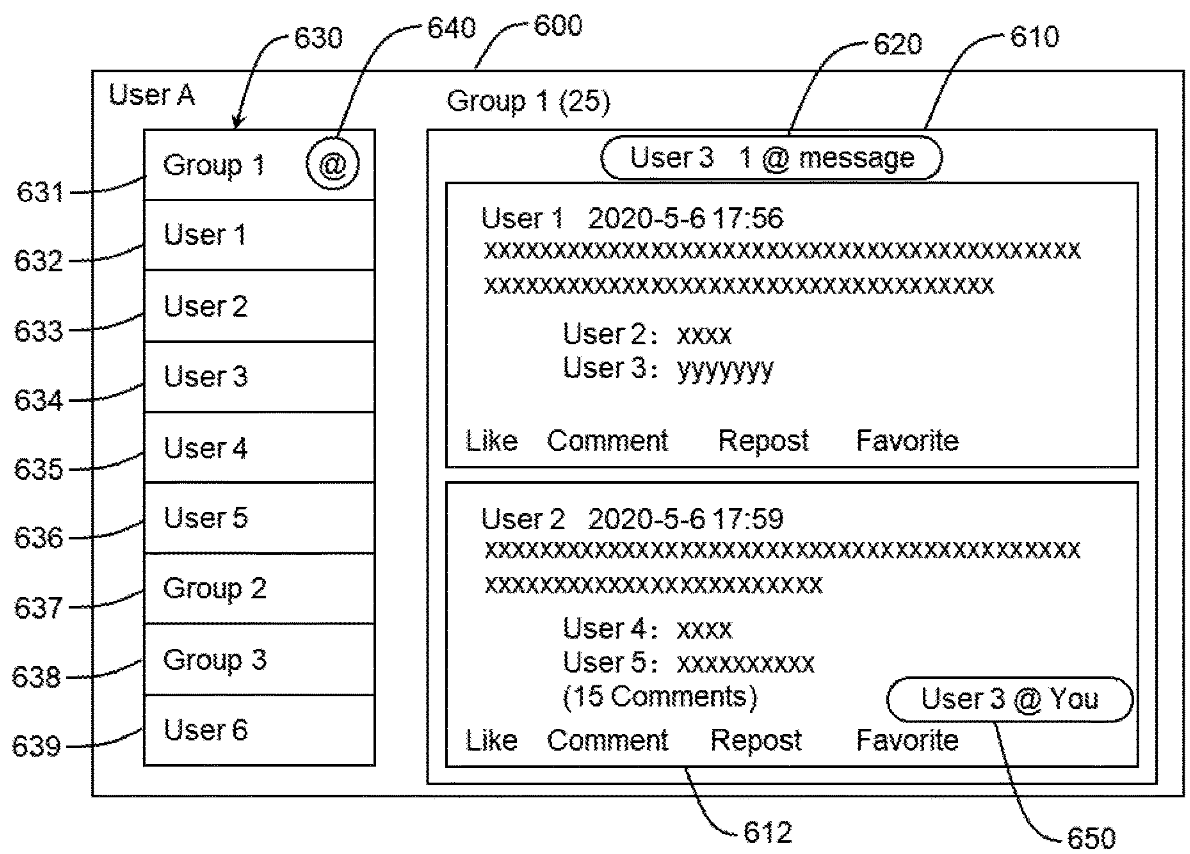
FIG. 6 shows a schematic diagram of a user interface of a client according to further embodiment of the present disclosure.

Exemplarily, referring to FIG. 6, a client 600 is provided with a communication selection interface 630 including communication entry interfaces 631-639 which are configured to respectively access corresponding communication user interfaces, for example, the communication entry interface 631 of "group 1" is configured to access a communication user interface associated with the "group 1", the communication entry interface 632 of "user 1" is configured to access a communication user interface associated with "user 1", and so on. If the client receives a message which contains an identifier associated with "user A" (such as "@user A") and is posted by "user 3" in a message user interface 612 of a communication user interface 610, the client 600 displays fourth reminder 640 (for example, an avatar or ID of "user 3") on the communication entry interface 631 of "group 1".

Referring to FIG. 6, due to too many comments received in the message user interface 612, the first new target message is invisible to the user currently, and the client 600 may display third reminder 650 "User 3 @You" on the message user interface 612 accordingly to remind the user to expand the message user interface 612 so as to view the first new target message which is not displayed on the message user interface 612 at present.

In some embodiments, the communication selection interface includes an information flow (Feed flow) user interface, and the communication entry interfaces are information units (Feed) of the information flow user interface. Exemplarily, each of the information units may display relevant pictures and texts, such as a user avatar, a user name, all or a part of contents of messages which are received recently and the latest session time. The information flow user interface may update an arrangement order of the information units and contents displayed in the information units by receiving a new information flow pushed by a server. And in response to the user's operation on the information unit, a corresponding communication user interface is displayed.

In some embodiments, the user information comprises a user name or a user avatar.

Optionally, if the communication user interface is associated with a public group, it is defaulted that only a group administrator is allowed to send a mentioned message that mentions all members of a group. For example, it is defaulted that the group administrator is allowed to tap "@all" to mention all users in the message room. And the group administrator who has the highest level of authority a member can have in a group is allowed to grant the permission to send the mentioned message to one or more of the members. The public group is available for all users, and the users may actively join in the public group by search, view messages in the group, and participate in discussion.

Optionally, if the communication user interface is associated with a private group, it is defaulted that all members are allowed to send the mentioned message that mentions all members in the group. For example, it is defaulted that all the members are allowed to tap "@all" to mention all users in the message room. And a group administrator is allowed to modify the permission to send the mentioned messages so that only the group administrator has the permission to send a message that mentions all the group members. The private group is only visible for the members and only allows a member to join in by invitation from the members of the group.

Optionally, if the communication user interface is associated with the group, if the number of the members in the group is not smaller than a preset threshold, the client reminds the group administrator of restricting the permission to send the mentioned message that mentions all the members to only to the group administrator. For example, the client may display the content that "there are a large number of members in the group, to avoid disturbance, it is recommended that you may start a function that 'only the group administrator can @all' on a group setting interface".

According to one or more embodiments of the disclosure, by managing the permission to send the mentioned message that mentions all the members, the noise in the group and interference of the mentioned messages can be reduced.

Figure 7:
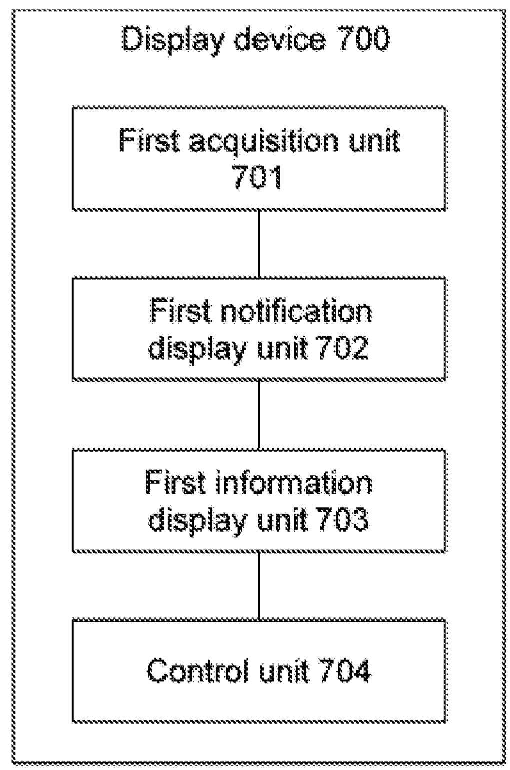
FIG. 7 shows a schematic structural diagram of a device for displaying information according to an embodiment of the present disclosure.

Correspondingly, as shown in FIG. 7, an embodiment of the disclosure provides a device 700 for displaying information, including:

- a first acquisition unit 701, configured to acquire a new target message associated with a user account currently logged in a client;
- a first notification display unit 702, configured to display a first reminder view associated with a first new target message;
- a first information display unit 703, configured to display a message user interface containing the first new target message in response to an operation of triggering the first reminder view; and
- a control unit 704, configured to associate the first reminder view with a second new target message after the first reminder view is triggered.

Correspondingly, according to one or more embodiments of the disclosure, provided is a device for displaying information, including:

- a second acquisition unit, configured to acquire a new target message associated with a user account currently logged in a client;
- a second notification display unit, configured to display a first reminder view associated with one of the new target message;
- a second information display unit, configured to display a message user interface containing the new target message associated with the first reminder view in response to an operation of triggering the first reminder view; and
- wherein new target message with which the first reminder is associated is replaced with another new target message accordingly as the first reminder view is triggered.

Figure 8:
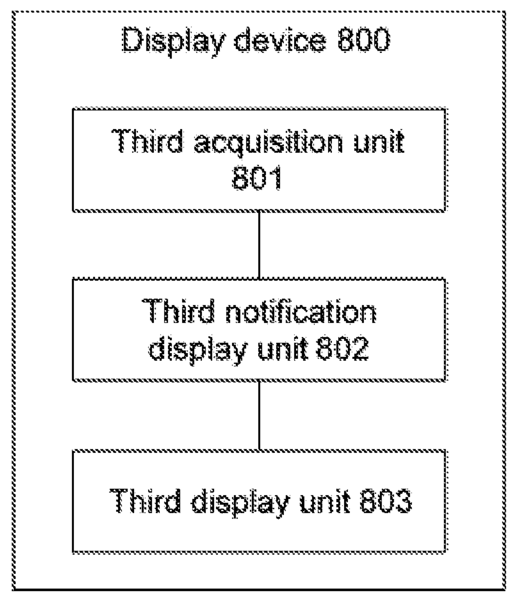
FIG. 8 shows a schematic structural diagram of a device for displaying information according to another embodiment of the present disclosure.

Correspondingly, as shown in FIG. 8, an embodiment of the disclosure provides a device 800 for displaying information, including:

- a third acquisition unit 801, configured to acquire a new target message associated with a user account currently logged in the client;
- a third notification display unit 802, configured to display a second reminder view associated with the new target message;
- a third information display unit 803, configured to display a topic user interface associated with a first new target message in response to an operation of triggering the second reminder view; and
- wherein a content displayed in the second reminder view is changed as one or more topic user interfaces associated with the new target message is first displayed in a display area of a terminal.

For the embodiments of the device, the embodiments of the device basically correspond to the embodiments of the method, and therefore, related parts refer to the description of a part of the embodiments of the method. The embodiments of the device described as above are merely illustrative, wherein the modules described as separation modules may be or not be separate. Parts or all of the modules may be selected according to an actual demand to achieve the purposes of the solutions of the embodiments. Those of ordinary skill in the art may understand and implement the solutions without creative work.

Correspondingly, the disclosure further provides a terminal comprising:

- at least one processor;
- and at least one memory communicatively coupled to the at least one processor and storing instructions that upon execution by the at least one processor cause the terminal to perform the foregoing method for displaying information.

Correspondingly, the disclosure further provides a non-transitory computer storage medium storing computer-readable instructions to perform the foregoing method for displaying information when the computer-readable instructions are executed by a computing device. The non-transitory computer storage media may be a ROM, a random access memory (RAM), a CD-ROM, a magnetic tape, a floppy disk, an optical data storage apparatus, etc.

Figure 9:
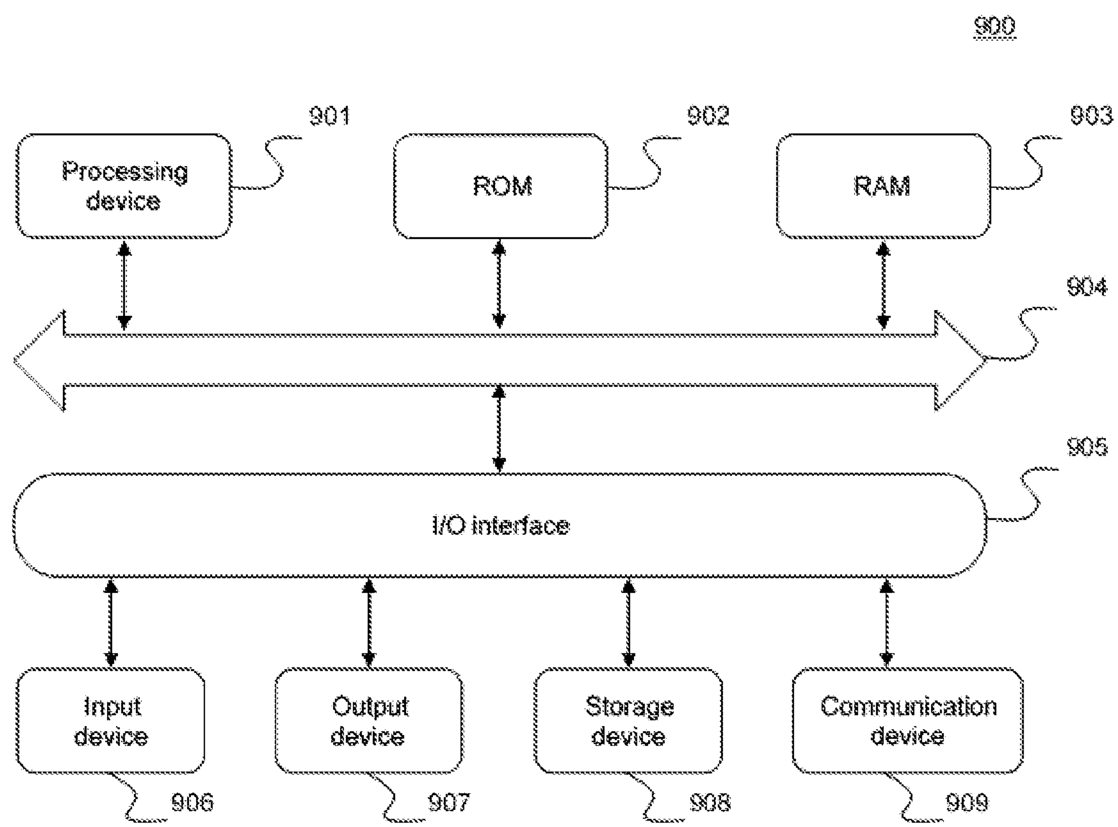
FIG. 9 shows a schematic structural diagram of a terminal device for implementing an embodiment of the present disclosure.

Referring now to FIG. 9, a structural schematic diagram of terminal equipment 900 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (0) and a vehicle-mounted terminal (e.g., vehicle-mounted navigation terminal), and fixed terminals such as a digital TV and a desktop computer. The terminal equipment shown in FIG. 9 is only an example, and should not bring any restrictions on the functions and application scope of the embodiments of the present disclosure.

As shown in FIG. 9, the terminal equipment 900 can comprise a processing device (e.g., central processing unit, graphics processor, etc.) 901, which can perform various appropriate actions and processing according to a program stored in a read-only memory (ROM) 902 or a program loaded into a random access memory (RAM) 903 from a storage device 908. In the RAM 903, various programs and data required for the operation of the terminal equipment 900 are also stored. The processing device 901, the ROM 902, and the RAM 903 are connected through a bus 904. An Input/Output (I/O) interface 905 is also connected to the bus 904.

Generally, the following devices can be connected to the I/O interface 905: an input device 906 such as a touch screen, a touch pad, a keyboard, a mouse, a camera, a microphone, an accelerometer and a gyroscope; an output device 907 such as a liquid crystal display (LCD), a speaker and a vibrator; a storage device 908 such as a magnetic tape and a hard disk; and a communication device 909. The communication device 909 can allow the terminal equipment 900 to perform wireless or wired communication with other equipment to exchange data. Although FIG. 9 shows the terminal equipment 900 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 909, or installed from the storage device 908, or installed from the ROM 902. When the computer program is executed by the processing device 901, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal or any suitable combination of the above. The computer-readable signal medium can also be any computer-readable medium other than the computer-readable storage medium, and the computer-readable signal medium can send, propagate or transmit the program for use by or in connection with the instruction execution system, device or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (HyperText Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: acquiring a new target message associated with a user account currently logged in a client; displaying a first reminder view associated with a first new target message; displaying a message user interface containing the first new target message in response to an operation of triggering the first reminder view; and associating the first reminder view with a second new target message after the first reminder view is triggered.

Or, the computer-readable medium carries one or more programs, and when the one or more programs are executed by the terminal equipment, the terminal equipment is caused to: acquiring one or more new target messages associated with a user account currently logged in a client; displaying a first reminder view associated with any of the one or more new target messages; displaying a message user interface containing the new target message associated with the first reminder view in response to an operation of triggering the first reminder view, wherein the new target message with which the first reminder view is associated is replaced as the first reminder view is triggered.

Or, the computer-readable medium carries one or more programs, and when the one or more programs are executed by the terminal equipment, the terminal equipment is caused to: acquiring a new target message associated with a user account currently logged in the client; displaying a second reminder view associated with the new target message; displaying a topic user interface associated with a first new target message in response to an operation of triggering the second reminder view, wherein a content displayed in the second reminder view is changed as one or more topic user interfaces associated with the new target message is first displayed in a display area of a terminal.

Computer program codes for performing the operations of the disclosure can be written in one or more programming languages or a combination thereof, including object-oriented programming languages such as Java, Smalltalk, C++, and conventional procedural programming languages such as "C" language or similar programming languages. The program code can be completely or partially executed on a user computer, executed as an independent software package, partially executed on a user computer and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions and operations of possible implementations of systems, methods and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the task determination unit can also be described as "a unit for determining whether a view of a first task is currently displayed on a desktop".

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

In some embodiments, the disclosure provides a method for displaying information, comprising: acquiring a new target message associated with a user account currently logged in a client; displaying a first reminder view associated with a first new target message; displaying a message user interface containing the first new target message in response to an operation of triggering the first reminder view; and associating the first reminder view with a second new target message after the first reminder view is triggered.

In some embodiments, the disclosure provides a method further comprising: displaying a message user interface containing the second new target message in response to an operation of triggering the first reminder view if the first reminder view is associated with the second new target message.

In some embodiments, before the first reminder view is triggered, a content displayed in the first reminder view is associated with the first new target message.

In some embodiments, after the first reminder view is triggered, a content displayed in the first reminder view is associated with the second new target message.

In some embodiments, the displaying the first reminder view comprises: displaying the first reminder view on the message user interface containing the first new target message, and the displaying the message user interface containing the first new target message comprises: displaying a part of the message user interface where the first new target message is located to show the first new target message.

In some embodiments, the client is provided with a communication user interface configured to display one or more message user interfaces.

In some embodiments, the step of displaying the message user interface containing the first new target message comprises: displaying a part of the communication user interface where the message user interface containing the first new target message is located to show the message user interface.

In some embodiments, the step of associating the content displayed in the first reminder view with the first new target message comprises:

displaying user information of a user sending the first new target message on the first reminder view.

In some embodiments, after the first reminder view is triggered, the first reminder view displays user information of a user sending the second new target message.

In some embodiments, the user information comprises a user avatar and/or a user ID.

In some embodiments, the message user interface is configured to allow more than two users to interact with each other in the message user interface.

In some embodiments, the new target message comprises an identifier associated with the user account.

In some embodiments, the disclosure provides a method further comprising: displaying a third reminder on the message user interface containing the first new target message in the case that the first new target message is not currently represented on the message user interface containing the first new target message, wherein a content displayed in the third reminder is associated with the first new target message.

In some embodiments, the client is provided with a communication selection interface that includes at least one communication entry interfaces associated with the communication user interface; and the method provided further comprises: displaying a fourth reminder in the communication entry interface associated with the first new target message, wherein a content displayed in the fourth reminder is associated with the first new target message In some embodiments, the fourth reminder displays user information of a user sending the first new target message.

In some embodiments, if the communication user interface is associated with a public group, a permission for a user to send a message that mentions all group members of the group is restricted only to a group administrator of the public group by default, and the group administrator is allowed to grant the permission to one or more group members.

In some embodiments, if the communication user interface is associated with a private group, a permission for a user to send a message that mentions all group members of the group is granted to all group members by default, and a group administrator of the private group is allowed to modify the permission so that only the group administrator has the permission to send the message that mentions all the group members.

In some embodiments, if the communication user interface is associated with a group, the client reminds a group administrator of the group to restrict the permission for a user to send a message that mentions all group members of the group only to the group administrator if the number of the group members of the group is not smaller than a preset threshold.

In some embodiments, the disclosure provides a method for displaying information, comprising: acquiring one or more new target messages associated with a user account currently logged in a client; displaying a first reminder view associated with any of the one or more new target messages; displaying a message user interface containing the new target message associated with the first reminder view in response to an operation of triggering the first reminder view, wherein the new target message with which the first reminder view is associated is replaced as the first reminder view is triggered.

In some embodiments, the disclosure provides a method for displaying information, applied in an instant messaging client provided with a communication user interface for displaying one or more topic user interfaces, and the one or more topic user interface are configured to display target messages, the method comprising: acquiring a new target message associated with a user account currently logged in the client; displaying a second reminder view associated with the new target message; displaying a topic user interface associated with a first new target message in response to an operation of triggering the second reminder view, wherein a content displayed in the second reminder view is changed as one or more topic user interfaces associated with the new target message is first displayed in a display area of a terminal.

In some embodiments, the step of displaying a second reminder view associated with the new target message comprises: displaying the second reminder view in the communication user interface; and the step of displaying a topic user interface associated with a first new target message comprises: displaying a part of the communication user interface where the topic user interface associated with the first new target message is located to show the topic user interface.

In some embodiments, the second reminder view displays the number of the new target message, and the number of the new target message displayed by the second reminder view is reduced as one or more topic user interfaces associated with the new target message is first displayed in a display area of a terminal.

In some embodiments, the topic user interface is configured to allow more than two users to interact with each other in the topic user interfaces.

In some embodiments, the disclosure provides a device, comprising: a first acquisition unit, configured to acquire a new target message associated with a user account currently logged in a client; a first notification display unit, configured to display a first reminder view associated with a first new target message; a first information display unit, configured to display a message user interface containing the first new target message in response to an operation of triggering the first reminder view; and a control unit, configured to associate the first reminder view with the second new target message after the first reminder view is triggered.

In some embodiments, the disclosure provides a device, comprising: a second acquisition unit, configured to acquire one or more new target messages associated with a user account currently logged in a client; a second notification display unit, configured to display a first reminder view associated with any of the one or more new target messages; a second information display unit, configured to display a message user interface containing the new target message associated with the first reminder view in response to an operation of triggering the first reminder view, wherein the new target message with which the first reminder view is associated is replaced as the first reminder view is triggered.

In some embodiments, the disclosure provides a device comprising: a third acquisition unit, configured to acquire a new target message associated with a user account currently logged in the client; a third notification display unit, configured to display a second reminder view associated with the new target message; a third information display unit, configured to display a topic user interface associated with a first new target message in response to an operation of triggering the second reminder view, wherein a content displayed in the second reminder view is changed as one or more topic user interfaces associated with the new target message is first displayed in a display area of a terminal.

In some embodiments, the disclosure further provides a terminal comprising: at least one processor; and at least one memory communicatively coupled to the at least one processor and storing instructions that upon execution by the at least one processor cause the terminal to perform the foregoing method for displaying information.

In some embodiments, the disclosure further provides a non-transitory computer storage medium storing computer-readable instructions to perform the foregoing method for displaying information when the computer-readable instructions are executed by a computing device.

The above description is only a preferred embodiment of the disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A method for displaying information, comprising:

acquiring a new target message associated with a user account currently logged in a client;

displaying a first reminder view associated with a first new target message, wherein the first reminder view is configured to display a summary of an associated new target message in the first reminder view;

displaying a message user interface containing the first new target message in response to an operation of triggering the first reminder view that displays a summary of the first new target message;

associating the first reminder view with a second new target message after the first reminder view displaying the summary of the first new target message is triggered, wherein the first reminder view is a same reminder view located at a same location of a communication user interface, wherein the communication user interface is associated with a group and comprises the message user interface, wherein the same reminder view is configured to be associated with different new target messages, and wherein a selection of the same reminder view causes to automatically move the message user interface to display a new target message currently associated with the same reminder view; and changing content displayed in the first reminder view by replacing the summary of the first new target message with a summary of the second new target message.

2. The method for displaying information according to claim 1, further comprising:

displaying a message user interface containing the second new target message in response to an operation of triggering the first reminder view if the first reminder view is associated with the second new target message.

3. The method for displaying information according to claim 1, wherein before the first reminder view is triggered, a content displayed in the first reminder view is associated with the first new target message, and/or wherein after the first reminder view is triggered, a content displayed in the first reminder view is associated with the second new target message.

4. The method for displaying information according to claim 3, wherein before the first reminder view is triggered, the first reminder view displays user information of a user sending the first new target message, and/or wherein after the first reminder view is triggered, the first reminder view displays user information of a user sending the second new target message.

5. The method for displaying information according to claim 4, wherein the user information comprises a user avatar and/or a user identifier.

6. The method for displaying information according to claim 1, wherein the displaying a first reminder view comprises: displaying the first reminder view on the message user interface containing the first new target message, and wherein the displaying a message user interface containing the first new target message comprises: displaying a part of the message user interface where the first new target message is located to show the first new target message.

7. The method for displaying information according to claim 1, wherein the client is provided with a communication user interface configured to display one or more message user interfaces.

8. The method for displaying information according to claim 7, wherein the client is provided with a communication selection interface that includes at least one communication entry interfaces associated with the communication user interface; and the method further comprises: displaying a fourth reminder in the communication entry interface associated with the first new target message, wherein a content displayed in the fourth reminder is associated with the first new target message.

9. The method for displaying information according to claim 8, wherein the fourth reminder displays user information of a user sending the first new target message.

10. The method for displaying information according to claim 7, wherein if the communication user interface is associated with a public group, a permission for a user to send a message that mentions all group members of the group is restricted only to a group administrator of the public group by default, and the group administrator is allowed to grant the permission to one or more group members, or wherein if the communication user interface is associated with a private group, a permission for a user to send a message that mentions all group members of the group is granted to all group members by default, and a group administrator of the private group is allowed to modify the permission so that only the group administrator has the permission to send the message that mentions all the group members, or wherein if the communication user interface is associated with a group, the client reminds a group administrator of the group to restrict the permission for a user to send a message that mentions all group members of the group only to the group administrator if the number of the group members of the group is not smaller than a preset threshold.

11. The method for displaying information according to claim 1, wherein displaying a message user interface containing the first new target message comprises: displaying a part of the communication user interface where the message user interface containing the first new target message is located to show the message user interface.

12. The method for displaying information according to claim 1, wherein the message user interface is configured to allow more than two users to interact with each other in the message user interface.

13. The method for displaying information according to claim 1, wherein the new target message comprises an identifier associated with the user account.

14. The method for displaying information according to claim 1, further comprising:

displaying a third reminder on the message user interface containing the first new target message in the case that the first new target message is not currently represented on the message user interface containing the first new target message, wherein a content displayed in the third reminder is associated with the first new target message.

15. A method for displaying information, comprising:

acquiring a new target message associated with a user account currently logged in a client which is provided with a communication user interface for displaying one or more topic user interfaces configured to display messages, wherein each of the one or more topic user interfaces is configured to allow a plurality of users to interact with each other about a corresponding topic;

displaying a second reminder view associated with the new target message, wherein the second reminder view is configured to indicate one or more new topics received by the client, wherein the second reminder view is a single reminder view located at a predetermined location of the communication user interface, wherein the communication user interface comprises the one or more topic user interfaces each of which is configured to display the messages and allow the plurality of users to interact with each other about the corresponding topic, and wherein a selection of the second reminder view causes to automatically position the communication user interface to a location where a latest new topic user interface is located, and wherein the new target message indicates a new topic corresponding to a new topic user interface; and displaying the new topic user interface corresponding to the new topic indicated by the new target message in response to an operation of triggering the second reminder view.

16. The method for displaying information according to claim 15, wherein the displaying a second reminder view associated with the new target message comprises: displaying the second reminder view in the communication user interface, and wherein the displaying a topic user interface associated with a first new target message comprises: displaying a part of the communication user interface where the topic user interface associated with the first new target message is located to show the topic user interface.

17. The method for displaying information according to claim 15, wherein the second reminder view displays the number of the new target message; and wherein the number of the new target message displayed by the second reminder view is reduced as one or more topic user interfaces associated with the new target message is first displayed in a display area of a terminal.

18. The method for displaying information according to claim 15, wherein the topic user interface is configured to allow more than two users to interact with each other in the topic user interfaces.

19. A device for displaying information, comprising:

at least one processor; and at least one memory communicatively coupled to the at least one processor and storing instructions that upon execution by the at least one processor cause the device to:

acquire a new target message associated with a user account currently logged in a client;

display a first reminder view associated with a first new target message, wherein the first reminder view is configured to display a summary of an associated new target message in the first reminder view;

display a message user interface containing the first new target message in response to an operation of triggering the first reminder view that displays a summary of the first new target message;

associate the first reminder view with a second new target message after the first reminder view displaying the summary of the first new target message is triggered, wherein the first reminder view is a same reminder view located at a same location of a communication user interface, wherein the communication user interface is associated with a group and comprises the message user interface, wherein the same reminder view is configured to be associated with different new target messages, and wherein a selection of the same reminder view causes to automatically move the message user interface to display a new target message currently associated with the same reminder view; and change content displayed in the first reminder view by replacing the summary of the first new target message with a summary of the second new target message.

20. A device for displaying information, comprising:

at least one processor; and at least one memory communicatively coupled to the at least one processor and storing instructions that upon execution by the at least one processor cause the device to:

acquire a new target message associated with a user account currently logged in a client which is provided with a communication user interface for displaying one or more topic user interfaces configured to display messages, wherein each of the one or more topic user interfaces is configured to allow a plurality of users to interact with each other about a corresponding topic;

display a second reminder view associated with the new target message, wherein the second reminder view is configured to indicate one or more new topics received by the client, wherein the second reminder view is a single reminder view located at a predetermined location of the communication user interface, wherein the communication user interface comprises the one or more topic user interfaces each of which is configured to display the messages and allow the plurality of users to interact with each other about the corresponding topic, and wherein a selection of the second reminder view causes to automatically position the communication user interface to a location where a latest new topic user interface is located, and wherein the new target message indicates a new topic corresponding to a new topic user interface; and display the new topic user interface corresponding to the new topic indicated by the new target message in response to an operation of triggering the second reminder view.

* * * * *